I. HOFFMAN.
RECEPTACLE FOR GARBAGE AND WASTE PAPER.
APPLICATION FILED MAY 17, 1911.
1,013,775.
Patented Jan. 2, 1912.
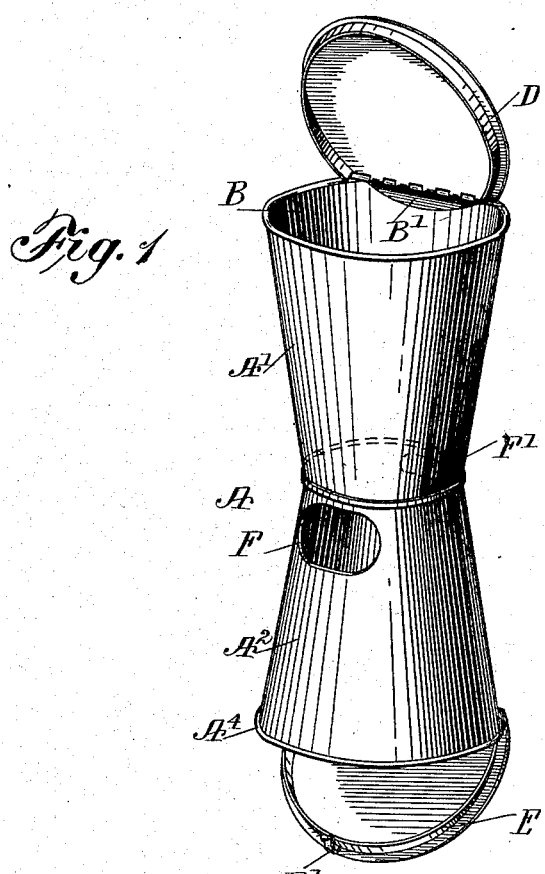
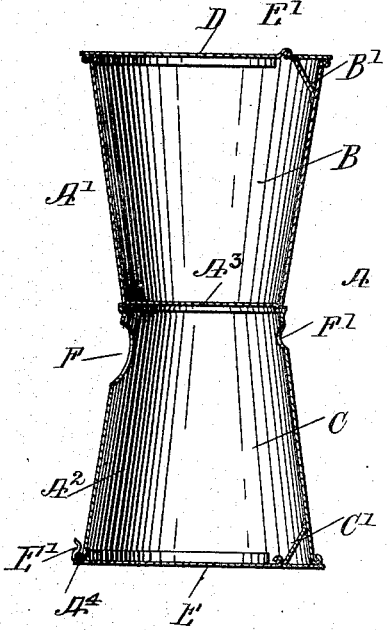
WITNESSES
INVENTOR
Israel Hoffman
BY
ATTORNEYS

UNITED STATES PATENT OFFICE.

ISRAEL HOFFMAN, OF NEW YORK, N. Y.

RECEPTACLE FOR GARBAGE AND WASTE PAPER.

1,013,775.  Specification of Letters Patent.  Patented Jan. 2, 1912.

Application filed May 17, 1911. Serial No. 627,647.

*To all whom it may concern:*

Be it known that I, ISRAEL HOFFMAN, a citizen of the United States, and a resident of the city of New York, borough of Manhattan, in the county and State of New York, have invented a new and Improved Receptacle for Garbage and Waste Paper, of which the following is a full, clear, and exact description.

The object of the invention is to provide a new and improved receptacle for separately receiving and storing garbage and waste paper, and arranged to permit of conveniently carrying the receptacle about and emptying the same of its contents separately. For the purpose mentioned, use is made of a receptacle having separate upper and lower compartments, of which the upper compartment is for the reception of garbage and the lower compartment is for receiving waste paper, the upper compartment having a hinged lid and the lower compartment having side openings for the introduction of waste paper, and a hinged bottom for opening and closing the lower compartment.

A practical embodiment of the invention is represented in the accompanying drawings forming a part of this specification, in which similar characters of reference indicate corresponding parts in both views.

Figure 1 is a perspective view of the receptacle with the cover and bottom in open positions; and Fig. 2 is a transverse section of the same with the cover and bottom in closed positions.

The body A of the receptacle is formed of two hollow parts A', A², in the form of cone frusta united with each other at their apex ends, and with a horizontal partition A³ extending at the joint of the parts A' and A² so as to separate the body A into an upper compartment B for the reception of garbage and the like, and a lower compartment C for the reception of waste paper.

The upper compartment B is adapted to be closed by a cover or a lid D, preferably of the hinged type, and the bottom of the lower compartment C is adapted to be opened or closed by a hinged bottom E, provided at its free end with a suitable spring catch E' adapted to engage an annular rim A⁴ at the lower end of the part A², as will be readily understood by reference to Fig. 2. The lower part A² is provided on diametrically opposite points and near the upper end of the part with openings F and F', serving as handholds for carrying the receptacle about, the opening F being enlarged so as to form a ready entrance for the waste paper to be placed into the lower compartment C.

It is understood that normally the bottom E is closed so that waste paper can be readily passed through the opening F into the lower compartment C to accumulate therein, and the garbage may be placed into the upper compartment B when the lid or cover D thereof is in open position. After the garbage is introduced the lid is closed so as to prevent odors from rising into the room in which the receptacle is located at the time. When the compartments B and C are filled, the receptacle can be conveniently carried out and its contents dumped separately by, say, first opening the lid or cover D and emptying the garbage into another receptacle, and then unlocking the bottom E and allowing the same to swing open by its own weight so that the waste paper is discharged from the lower compartment C into another receptacle.

It is understood that for emptying the compartment C, the receptacle has to be lifted off the ground so as to permit the bottom E to swing into an open position for the discharge of the waste paper.

It will be noticed that by the arrangement described the lower compartment C is widest at the bottom and hence when the bottom E is opened the waste paper readily drops out without danger of sticking in the compartment.

The compartments B and C are provided with inclined portions B', C' in the rear of the hinges for the cover D and bottom E, to prevent garbage or waste paper from sticking at those points when emptying the receptacle as above described.

After the paper is discharged the bottom E is swung into a closed position so that the receptacle may be conveniently set on the floor or other support.

By arranging the receptacle in the manner shown and described it takes up very little room and is especially well adapted for use in kitchens and other similar places.

Having thus described my invention, I claim as new and desire to secure by Letters Patent:—

1. A receptacle for garbage and waste paper, comprising a body formed of two cone frusta mounted at the apex ends, and a transverse partition at the junction of the said cone frusta, the partition dividing the said body into an upper compartment for the reception of garbage and a lower compartment having side openings forming handholds and serving for introducing waste paper into the lower compartment, a lid for the upper compartment, and a hinged bottom for closing or opening the lower compartment.

2. A receptacle for garbage and waste paper, comprising a body formed of two cone frusta united at the apex ends, and a transverse partition at the junction of the said cone frusta, the partition dividing the said body into an upper compartment for the reception of garbage, and a lower compartment having side openings forming handholds and located at the upper end of the lower compartment, one of the said openings being enlarged to form an entrance for placing waste paper into the lower compartment, a hinged lid for opening and closing the said upper compartment, and a hinged bottom for closing or opening the said lower compartment.

In testimony whereof I have signed my name to this specification in the presence of two subscribing witnesses.

ISRAEL HOFFMAN.

Witnesses:
 THEO. G. HOSTER,
 J. P. DAVIS.